United States Patent [19]

Speckhart et al.

[11] Patent Number: 5,220,511
[45] Date of Patent: Jun. 15, 1993

[54] COMPUTER CONTROL SYSTEM AND METHOD FOR SORTING ARTICLES ON A CONVEYOR

[75] Inventors: Bernard Speckhart, Short Hills, N.J.; Craig Davidson, Cardiff by the Sea, Calif.; Paul M. Berson, Mountain Lakes, N.J.

[73] Assignee: White Conveyors, Inc., Kenilworth, N.J.

[21] Appl. No.: 643,777

[22] Filed: Jan. 22, 1991

[51] Int. Cl.[5] .............................................. G06F 15/46
[52] U.S. Cl. ............................ 364/478; 198/349.95
[58] Field of Search ............................ 364/478, 479; 198/349.95, 680, 678.1, 465.4, 464.2; 207/937; 414/331, 273, 274; 235/375, 385

[56] References Cited

U.S. PATENT DOCUMENTS

| | | |
|---|---|---|
| 1,217,986 | 3/1917 | Parce . |
| 1,217,987 | 3/1917 | Parce . |
| 1,217,988 | 3/1917 | Parce . |
| 1,247,535 | 11/1917 | Huddleston . |
| 1,597,527 | 8/1926 | Lane . |
| 1,808,405 | 6/1931 | Hurd . |
| 1,808,406 | 6/1931 | Gammell . |
| 1,813,229 | 7/1931 | Constable . |
| 1,816,331 | 7/1931 | Kruschwitz . |
| 1,823,773 | 9/1931 | Troy . |
| 1,902,088 | 3/1933 | Maurer . |
| 2,000,404 | 5/1935 | Maul ............................ 209/111 |
| 2,362,683 | 11/1944 | Weinberg ....................... 209/80 |
| 2,989,181 | 6/1961 | Dickinson ...................... 209/111 |
| 2,993,595 | 7/1961 | Dickinson et al. ............. 209/111.5 |
| 3,075,653 | 1/1963 | Wales et al. ................... 214/11 |
| 3,550,751 | 12/1970 | Jack, Jr. ........................ 198/38 |
| 3,564,271 | 2/1971 | Nearman ........................ 250/223 |
| 3,612,250 | 10/1971 | Thompson et al. ............. 198/38 |
| 3,696,946 | 10/1972 | Hunter et al. .................. 214/11 R |
| 3,840,103 | 10/1974 | Willis ............................ 194/4 R |
| 3,880,298 | 4/1975 | Habegger et al. .............. 214/11 R |
| 3,917,112 | 11/1975 | Willis et al. ................... 221/1 |
| 4,114,538 | 9/1978 | Nicodemus, Jr. et al. ...... 104/88 |
| 4,239,435 | 12/1980 | Weiss et al. .................... 414/136 |
| 4,484,288 | 11/1984 | Riemenschneider ............ 364/478 |
| 4,618,932 | 10/1986 | Sauer ............................. 364/478 |
| 4,803,634 | 2/1989 | Ohno et al. .................... 364/478 |
| 4,835,702 | 5/1989 | Tanaka .......................... 364/478 |
| 4,983,091 | 1/1991 | Lichti, Sr. et al. ............. 364/478 |
| 4,991,719 | 2/1991 | Butcher et al. ................ 364/478 |
| 5,058,750 | 10/1991 | Graese .......................... 209/583 |
| 5,072,822 | 12/1991 | Smith ........................... 198/349 |

FOREIGN PATENT DOCUMENTS

| | | | |
|---|---|---|---|
| 730287 | 3/1966 | Canada ............................ 340/30 |
| 1004625 | 2/1977 | Canada ............................ 203/18 |

OTHER PUBLICATIONS

Master-Veyor brochure, published by Speed Check Conveyor Co. Inc., Decatur, Ga. pp. 1-4.

(List continued on next page.)

*Primary Examiner*—Jerry Smith
*Assistant Examiner*—Jim Trammell
*Attorney, Agent, or Firm*—Kenyon & Kenyon

[57] ABSTRACT

A system and method for sorting articles. An exemplary embodiment of the system includes a conveyor for transporting articles, a database for storing identification information for each article on the conveyor and address information specifying the location of each article on the conveyor, one or more drop stations adjacent to the conveyor for unloading articles, a processor, coupled to the conveyor, the one or more drop stations, and the database, for accessing article information from the database, allocating to each of one or more drop stations a list of articles sorted according to one or more sorting criteria, and for controlling each such drop station to physically sort articles from the sorting conveyor into a group of sorted articles according to the sorted list of articles for the drop station. An exemplary method concerns physically unloading articles on a conveyor at one or more drop stations through the steps of allocating to each of one or more drop stations a list of articles to be physically unloaded by the drop station, sorting each list of articles according to one or more sorting criteria, and controlling the operation of each of the one or more drop stations to physically unload articles according to a sorted list.

51 Claims, 3 Drawing Sheets

OTHER PUBLICATIONS

Sorting Carousel brochure, published by Dunnewolt U.S.A. Inc., Dallas, Tx. pp. 1-4.

My-T-Veyor brochure, Model No. 830, published by My-T-Veyor, Oxford, Mi. pp. 1-3.

Sort-O-Veyor brochure, published by Speed Check Conveyor Co. Inc., Decatur, Ga., pp. 1-4.

Quick Assembly brochure, published by Natmar, Inc., Cincinnati, Ohio, pp. 1-2.

Controlling Hospital Garments, Wim Giezeman, Textile Rental, Jun. 1982, pp. 34-36, 38.

| SUB-FIELD₁ | SUB-FIELD₂ | SUB-FIELD₃ | SUB-FIELD₄ |
|---|---|---|---|
| 101 | 102 | 103 | 104 |

COMPUTER CONTROL SYSTEM AND METHOD FOR SORTING ARTICLES ON A CONVEYOR

FIELD OF THE INVENTION

The present invention relates generally to the field of sorting a collection of randomly arranged articles into a desired order, and specifically to sorting a collection of such articles which are loaded onto a sorting conveyor.

BACKGROUND OF THE INVENTION

When sorting a collection of unsorted articles is desired, a sorting conveyor can be used to accomplish the task. A sorting conveyor is a circular, rectangular, or other shape endless chain or line having associated with it one or more loading stations where unsorted articles are placed onto the conveyor and one or more drop stations where articles are deposited into sorted groups.

Loading the sorting conveyor with articles to be sorted involves moving the conveyor past a loading station. At the loading station, articles from an unsorted sequence of articles are placed, one by one, onto the sorting conveyor at discrete points along its length. The sorting conveyor can be loaded with articles in any order.

The sorting of articles is accomplished by moving the loaded conveyor past a drop station which selects certain articles from the conveyor in a specified order. In this way, a sequence of articles loaded on the sorting conveyor can be converted into a sorted sequence at one or more drop stations.

In order to sort a collection of unsorted articles using a sorting conveyor, it is necessary to determine the identity of each article. Furthermore, the identity of each article must be associated with the location on the sorting conveyor at which such article is loaded.

Once loaded on the sorting conveyor, the articles can be sorted. Generally, the sorting process involves selecting particular articles to unload from the sorting conveyor. The order of the sort is the order in which articles are removed from the sorting conveyor at one or more drop stations.

SUMMARY OF THE INVENTION

The present invention provides a computer processor control system for physically sorting articles loaded at "loading points" along a sorting conveyor. The physical sorting of articles occurs by the movement of the loaded sorting conveyor past "drop stations," which unload selected articles as they pass by. The movement of the sorting conveyor and the unloading of articles at drop stations occurs under the control of a computer called the "control processor."

Articles on the sorting conveyor—articles to be sorted by the system of the present invention—may appear in any order. The identity of each article, as indicated by article identification information associated with each article, and the location of each article along the sorting conveyor, as indicated by each article's "loading point address," are stored in a database accessible by the control processor. Prior to the physical sorting of articles at drop stations, the control processor of the present invention sorts article identification information in the database, according to certain sorting criteria, to determine the order in which articles on the sorting conveyor are to be unloaded at given drop stations. The results of database information sorting are used by the control processor to command and control the physical sorting, i.e., unloading, of articles on the sorting conveyor at the drop stations.

The sorting of database information by the control processor involves the creation of an index to the articles in ascending article identification order. This index defines a sequence of loading point addresses at which articles in ascending article identification order are located on the sorting conveyor. The sorting of database information by the control processor also involves allocating (or assigning) to each drop station a list of articles to be unloaded (or sorted) by it. Each list, referred to as a "work list," identifies articles by their article identification number and location on the sorting conveyor. The work lists are used by the control processor to command the unloading of listed articles as they pass each drop station on the moving sorting conveyor.

As part of the work list allocation process to individual drop stations, the control processor takes advantage of the presence of identical articles on the sorting conveyor to help optimize the sorting process for each drop station, thereby helping to reduce the time it takes to complete a sort. Also, the control processor provides a capability allowing a user to select certain allocation criteria for the work lists of a given sort. The control processor's recognition of identical articles loaded on the sorting conveyor and its provision for user-selected criteria on generating work lists provide for a physical sort which requires less knowledge of the sort by persons who handle groups of sorted articles at the drop stations.

BRIEF DESCRIPTION OF THE DRAWINGS

FIG. 2 depicts exemplary article identification information.

DETAILED DESCRIPTION

The Sorting Conveyor

Figure 1:
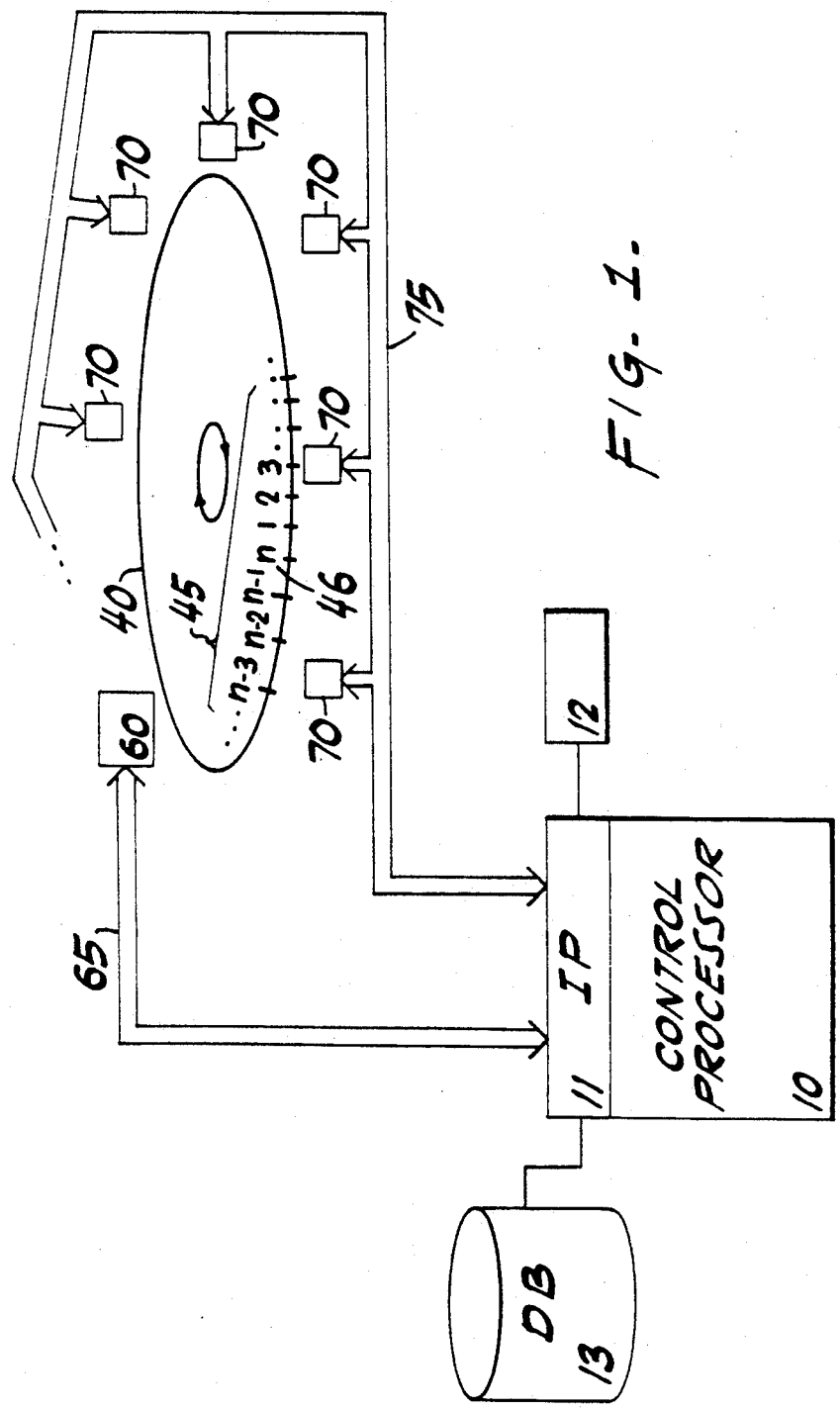
FIG. 1 depicts the present invention in an exemplary embodiment.

An exemplary embodiment of the system of the present invention is presented in FIG. 1. A sorting conveyor 40 is provided for holding articles to be sorted by the system. Articles on the sorting conveyor 40 may be in any sequence or order. The articles (not shown) can be any articles adapted to be releasably loaded on the sorting conveyor 40, for example, garments hung on hangers. The sorting conveyor 40 is shown as a circular conveyor for simplicity; however, it may assume any shape so long as it is an unbroken chain or line. The sorting conveyor 40 is driven by motor unit 60 under the control of control processor 100 (see below). Sorting conveyor motor unit 60 is coupled to control processor 10 via data interconnect 65 and interface processor 11.

Adjacent to the sorting conveyor 40 at one or more points along its length are one or more drop stations 70. Each drop station 70 is capable of removing (or unloading) an article from a loading point 45 adjacent to it on the moving sorting conveyor 40. The operation of each drop station 70 is controlled by commands received from the control processor 10 via interface processor 11 and data interconnect 75 (see below).

Each article in the sequence of articles loaded on the sorting conveyor 40 bears "article identification information" ("AID") identifying that article (thus, each article bears an $AID_i$, where "i" denotes any specific AID in the sequence of AIDs; the sequence of AIDs corresponds on a one to one basis with the sequence of articles on the sorting conveyor 40).

FIG. 2 is graphic representation of $AID_i$ information identifying an article. The $AID_i$ can be a single field of information bits or it can be logically sub-divided into a collection of sub-fields 100 as shown in the figure. Each sub-field 101-104 can represent something pertinent to a physical sort to be performed. For example, if the articles are laundered garments, a sort may be made according to "delivery route"—the number assigned to identify a route taken by a delivery driver when delivering laundered garments. Within a given route, it may be desireable to sort according to "customer account-"—the number assigned to identify a customer in a given route to whom garments are to be delivered. For a given customer, it may be desirable to sort according to "garment wearer"—the number assigned to identify the person who wears the garment, typically an employee of the customer. For a given garment wearer, it may be desireable to sort according to "garment type'-'—the number assigned to differentiate one type of garment from another type of garment, for example, pants from shirts. Thus, as shown in FIG. 2, the sub-fields have the following exemplary order: $SUB\text{-}FIELD_1$ 101 holds the delivery route number, $SUB\text{-}FIELD_2$ 102 holds the customer account number, $SUB\text{-}FIELD_3$ 103 holds the garment wearer identification number, and $SUB\text{-}FIELD_4$ 104 holds the garment type number.

Of course, this order of sub-fields is only exemplary; sub-fields may appear in any order in the AIDs of a group of articles, regardless of the order in which they will be considered when sorted by the control processor 10. That is, as long as the control processor is aware of the order of sub-fields in the AIDs of a group of articles, the sub-fields may appear in any order and the control processor 10 can, once such sub-fields are scanned, rearrange the order of sub-field information to accomplish sorting based on any order desired.

Regardless of whether an $AID_i$ comprises a single field or a plurality of sub-fields of information bits, the $AID_i$ identifies the article for purposes of sorting. It may be, for example, that two distinct articles bear AIDs which are the same. This means that the two articles are interchangeable as far as sorting is concerned (a benefit is derived from this interchangeability by the present invention; see the discussion below with reference to Tables III and IV). In any one embodiment of the present invention, it may be useful to include an additional sub-field, or extra bits, in the AID, to uniquely identify an article for all purposes (i.e., not merely for sorting).

Along the length (or path) of the sorting conveyor 40 are "loading points" 45. The loading points 45 are discrete points where unsorted articles can be loaded for later sorting. Each loading point 45 has associated with it an address (or defined location) along the sorting conveyor 40. Each loading point address ("$LP_j$," where "j" denotes any specific loading point address) is determined with respect to a reference point 46 (which may itself be a loading point) on the sorting conveyor 40. A reference point 46 on the sorting conveyor 40 can be designated arbitrarily. Once designated, each loading point address, $LP_j$, can be defined by its distance—for example, by the number of loading points 45 it is away—from the reference point.

For example, with reference to the sorting conveyor 40 shown in FIG. 1, any $LP_j$ 45 along the sorting conveyor 40 can be designated as the "end" or last loading point address, identified by the designation "$LP_n$" (where "n" is the total number of loading point addresses on the sorting conveyor 40). This $LP_n$ serves as the reference point 46. Extending around the sorting conveyor 40 from the reference point 46 are $LP_j$s 45 which are identified by their distance, e.g., in loading point count, from the reference point 46. Assuming the sorting conveyor 40 moves in a clock-wise direction when loading and sorting (from the perspective of looking down from above the sorting conveyor 40) and that there are "n" loading points including the reference point, $LP_j$s 45 beginning with the first one to the right of the reference point 46 are identified as $LP_1$, $LP_2$, $LP_3$, ..., $LP_{n-3}$, $LP_{n-2}$, $LP_{n-1}$, $LP_n$ (i.e., the LP index "j" can take on values 1 to "n"). Thus, the loading point addresses begin with $LP_1$, wrap around the sorting conveyor 40, and end with the reference point, $LP_n$. In this way, all discrete loading point addresses, including the reference point, can be referenced by the control processor 10 of the present invention.

As discussed above, the operation of the system of the present invention is controlled by the control processor 10 shown in FIG. 1. An embodiment of the present invention can also include an interface processor 11, coupled to the control processor 10 and the data interconnects 65 and 75, to provide a user interface to the system to control the system's overall operation from a workstation or terminal 12, and to provide for system reporting functions. The interface processor 11 can also provide an interface to a database 13. The database 13 stores data relevant to the sorting of articles loaded on the sorting conveyor 40. That is, article identification and sorting conveyor address information, $AID_i$ and $LP_j$, for each such article. The creation of an exemplary database 13 is discussed in co-pending U.S. Application Ser. No. 07/643,780, entitled "Computer Control System and Method for Scanning and Loading Articles On a Conveyor," filed on even date herewith, which has been assigned in common with the present application to White Conveyors, Inc., Kenilworth, N.J. and which is hereby incorporated by reference as if set forth fully herein. The present invention does not require an interface processor 11, as the functions of the interface processor 11 can be performed by the control processor 10. However, the embodiment which includes the interface processor 11 is preferred. The sorting conveyor 40 of the present invention may be any sorting conveyor known in the art. In the case of a conveyor system for sorting garments on hangers, an exemplary sorting conveyor is described in U.S. Pat. No. 4,239,435, issued on Dec. 16, 1980, and is hereby incorporated by reference as if set forth fully herein.

The Sorting Conveyor Motor Unit

The sorting conveyor motor unit 60 shown in FIG. 1 includes a motor (for example an electric motor) for driving the sorting conveyor 40, a clutch drive system for engaging the motor and the sorting conveyor 40, and interface circuitry for receiving commands from the control processor 10 via data interconnect 65 and interface processor 11. The commands to the sorting conveyor motor unit 60 allow the control processor 10 to start and stop the sorting conveyor 40 as needed. An exemplary set of commands to accomplish this control comprises:

(1) CONVEYOR READY—This command from the control processor 10 to the sorting conveyor motor unit 60 causes the motor interface circuitry to place the motor in a slow speed and to release the clutch (i.e., disengage the motor/sorting conveyor 40 drive linkage). This command leaves the sorting conveyor 40 motionless but ready to be moved at the slow speed.

(2) CONVEYOR SLOW—This command from the control processor 10 to the sorting conveyor motor unit 60 causes the motor interface circuitry to place the motor in a slow speed and engage the clutch (i.e., engage the motor/sorting conveyor 40 drive linkage). This command places the sorting conveyor 40 in motion at a slow speed.

(3) CONVEYOR FAST—This command from the control processor 10 to the sorting conveyor motor unit 60 causes the motor interface circuitry to place the motor in a fast speed and engage the clutch. This command places the sorting conveyor 40 in motion at a fast speed.

(4) CONVEYOR STOP—This command from the control processor 10 to the sorting conveyor motor unit 60 causes the motor interface circuitry to stop the motor and to release the clutch. This command leaves the sorting conveyor 40 motionless.

The Drop Stations

The drop stations 70 shown in FIG. 1 physically unload articles from the sorting conveyor 40. The operation of each drop station 70 is controlled by commands received from the control processor 10 via interface processor 11 and data interconnect 75. An exemplary set of commands from the control processor 10 to a drop station 70 comprises:

(1) UNLOAD—The UNLOAD command is sent to a drop station 70 to direct the unloading of an article from a loading point 45 then adjacent to the drop station 70. In response to this command, the drop station 70 performs the unloading of the article by, for example, moving an unloading mechanism from a position where it does not intercept articles moving past the drop station 70 ("ready position") to a position where it performs the unloading of an article ("unload position").

(2) READY FOR UNLOADING—The READY FOR UNLOADING command is sent to a drop station 70 to direct the drop station 70 to place itself in condition to receive an UNLOAD command and hence unload an article. In response to this command, the drop station 70 returns itself to the state it was in prior to receiving a UNLOAD command. For example, the drop station 70 can move the unloading mechanism from the unload position to ready position. After responding to this command, the drop station 70 is ready to perform the next unloading operation required of it by the control processor 10.

In addition to receiving and responding to commands from the control processor 10, a drop station 70 reports the occurrence of certain events to the control processor 10 which occur by virtue of the movement of the sorting conveyor 40 past the drop station 70. Each drop station 70 is equipped with sensors to detect and report these events. One of these events occurs when the conveyor's 40 reference point 46 passes a drop station 70. Another occurs when any loading point passes a drop station 70 (see the discussion of the DropMain process of the control processor 10 below).

The configuration of an exemplary drop station and its sensors is discussed in co-pending U.S. Application Ser. No. 07/643,435, entitled "Apparatus for Unloading Articles" filed on even date herewith, which has been assigned in common with the present application to White Conveyors, Inc., Kenilworth, N.J. and which is hereby incorporated by reference as if set forth fully herein.

The Control Processor

Figure 3:
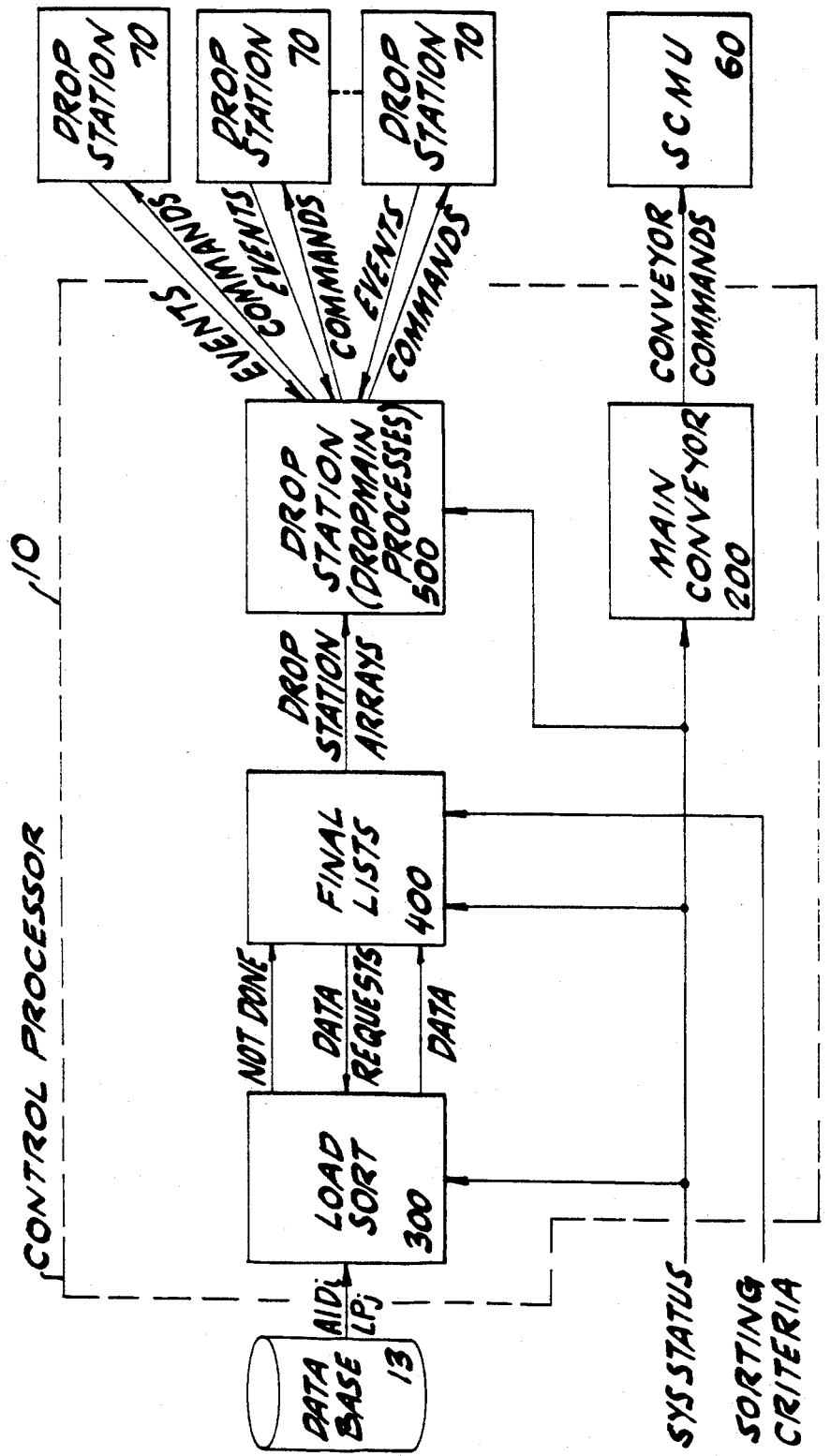
FIG. 3 depicts a data flow structure for an exemplary embodiment of the software processes of the present invention.

The control processor 10 of the present invention controls the movement of the sorting conveyor 40 and the operation of the drop stations 70 to accomplish the physical sorting of articles. This control is achieved through receipt of event information from the drop stations (see above) and the transmission of commands for controlling the operation of the sorting conveyor motor unit 60 and the unloading of articles from the sorting conveyor 40 by the drop stations 70. Control processor function is provided by software "processes." These processes react to event information provided by the drop stations 70, as well as information from the system user. FIG. 3 depicts a data flow structure for an exemplary embodiment of the software processes of the present invention.

The control processor 10 hardware of the present invention is a microprocessor, but other computer processors will suffice to execute the processes of the present invention. An exemplary microprocessor which can be used in the present invention is one made by the INMOS division of SGS Thompson, sold under the trademark "IMS T400".

To appraise the software processes of the control processor of current system conditions, the present invention provides a system status message, SYSSTATUS, which carries the mode of system operation to the software processes. The mode of the present invention is controlled by the system user. The initial mode of the present invention is a NON-SORT mode. When sorting of articles is desired, the user, via terminal 12, places the system in the SORT mode. Upon receipt of the SYSSTATUS message indicating the SORT mode, the processes of the control processor 10 receive the SORT mode information and commence the sorting of articles.

As discussed above, the control processor 10 of the present invention sorts article identification information contained in database 13 and uses the sorted information to control the unloading of articles at the various drop stations. The sorting of database information by the control processor 10 occurs in two phases, Phase I and Phase II. The operation of Phase I sorting is triggered by a system mode change from a non-SORT mode to the SORT mode. In phase I, a LoadSort process 300 of the control processor 10 determines an ascending sequence of AIDs for loaded articles, from the article on the sorting conveyor with the lowest AID to the article with the highest AID. As discussed above, the AID information can be comprised of a single string of information bits, or it may be comprised of a collection of sub-fields, each of which comprising a string of one or more bits. These sub-fields or bits can be rearranged by the control processor 10 prior to Phase I sorting to achieve any sort desired. Therefore, reference to AID information herein is generic, not implying any particular or necessary order of fields or bits. Once Phase I sorting is completed, Phase II sorting is performed.

In Phase II, a FinalLists process 400 of the control processor 10 allocates to each drop station an ordered work list of loading point addresses which each drop station is responsible for unloading. The FinalLists process 40 also optimizes the order of articles in the work list of each drop station according to certain sorting criteria.

Phase II sorting of database information is accompanied by the operation of a MainConveyor process 200 which puts the sorting conveyor 40 in motion at its fast speed such that the physical sorting of articles can occur.

Control of the physical sorting of articles from the sorting conveyor 40 is accomplished by a DropStation process 500 of the control processor 10. The DropStation process 500 uses the work lists for each drop station to control the physical sorting (or unloading) of articles by each drop station 70. The DropStation process 500 performs this task by receiving an indication from each drop station 70 of the loading point address, $LP_j$, adjacent to the drop station 70 at a point in time and by commanding each drop station 70 to unload an article when the loading point address of the sorting conveyor 40 at the drop station 70 equals the address of the next article to be unloaded as indicated by the work list for the drop station 70.

Phase I Sorting

LoadSort—The LoadSort process 300 accomplishes Phase I sorting of article identification and sorting conveyor address information received from the database 13. In Phase I, article identification information for the articles loaded on the sorting conveyor 40, AIDs, is sorted in ascending AID order. LoadSort 300 does this by first building a table of information comprising four arrays and then sorting the data in the table.

The first of the four arrays, the Article Identification Array, contains article identification numbers, in the order that the articles appear as loaded on the conveyor 40, for all articles to be sorted (i.e., $AID_i$ for $i=1$ to m, m being an integer equalling the total number of articles for sorting). Information for this array is obtained from the database 13. The second of the arrays, the Conveyor Loading Point Array, contains the loading point addresses where the articles are located on the sorting conveyor 40 (i.e., $LP_j$, for $j=1$ to m, m being defined above). As is the case with the Article Identification Array, information for this array is obtained from the database 13. The third of the four arrays, the Sorted Order Array, is, prior to sorting by LoadSort 300, an index to the articles in the order received from the database 13. After sorting, the Sorted Order Array is an index to the article identification information in ascending order. The fourth array, the Conveyor Index Array, is an index which allows checking for multiple AIDs at a loading point and for a loading point having no loaded article.

Prior to retrieving article identification and loading point address information from the database 13, LoadSort 300 clears memory space for the four arrays it will build, sets a variable (ARTCOUNT) indicating the number of articles for which information has been read from the database 13 to zero, sets a flag (NOTDONE) to indicate that the data in the arrays has not been sorted under Phase I, and loads each element in the Conveyor Index array with a bit string (the "UNINITIALIZED" bit string) to indicate that the corresponding element in the Conveyor Location Array has not been loaded yet.

Pairs of article identification numbers and loading point addresses, $AID_i$ and $LP_j$, are read from the database 13 one pair at a time by LoadSort 300. When the first $AID_i$ and $LP_j$ pair ($AID_1$, $LP_1$) is received, LoadSort 300 stores the article identification, $AID_1$, in the first element of the Article Identification Array, stores the conveyor address of the article, $LP_1$, in the first element in the Conveyor Loading Point Array, sets the first element in the Sorted Order Array to "1," to point to the article identification and loading point address just received ($AID_1$ and $LP_1$) and sets the element of the Conveyor Index Array corresponding to the loading point count, in this example, "1," equal to the first value in the Sorted Order Array. LoadSort 300 also sets the ARTCOUNT variable, indicating the number of articles for which information has been received from the database 13, to "1."

When subsequent article identification and loading point address information is received by LoadSort 300 from the database 13, LoadSort 300 examines the Conveyor Index Array element having a position equal to the conveyor location (in loading point count) of the article in question (e.g., if the received loading point address for the article is 2, then the second element of the Conveyor Index Array is examined; if the received loading point address is 3, then the third element of the Conveyor Index Array is examined; etc.).

If the examined element in the Conveyor Index Array contains an UNINITIALIZED bit string, LoadSort 300 stores the article identification and the conveyor loading point address in the first available, i.e. next, element of the Article Identification and Conveyor Loading Point Arrays, respectively. The last value stored in the Sorted Order Array is incremented and stored in the next element of the Array. This new value is also stored in the element of the Conveyor Index Array which was examined.

If the examined element of the Conveyor Index Array contains a bit string (or number) other than the UNINITIALIZED bit string, LoadSort 300 overwrites the last values to be stored in the Article Identification and the Conveyor Loading Point Arrays with the AID and loading point address values, respectively, received from the database 13. The last value stored in the Sorted Order Array is already stored in the appropriate element of the Conveyor Index Array. As such, no additional action concerning loading information in the Conveyor Index Array is taken by LoadSort 300 for the article in question.

In addition to examining and storing information in the four arrays, LoadSort 300 increments the ARTCOUNT variable responsive to the receipt of each article's identification and loading point address information.

Table I presents an example of the contents of the four arrays after the last set of information has been loaded from the database 13 into the Article Identification and the Conveyor Loading Point Arrays, and the Sorted Order and the Conveyor Index Arrays have been loaded with the appropriate information. The first column in Table I (with the heading "Sequence Number") does not represent information stored in any of the four arrays, but is included in Table I (and also in subsequent Table II) to provide a reference to the forty-five loading points of sorting conveyor 40 and for viewing the information contained in other columns of the Table.

TABLE I

| Sequence Number | Article Identification Array (AID$_i$) | Conveyor Loading Point Array (LP$_j$) | Sorted Order Array | Conveyor Index Array |
|---|---|---|---|---|
| 1 | E | 1 | 1 | 1 |
| 2 | D | 2 | 2 | 2 |
| 3 | A | 3 | 3 | 3 |
| 4 | G | 5 | 4 | UNINIT |
| 5 | A | 6 | 5 | 4 |
| 6 | C | 7 | 6 | 5 |
| 6 | C | 8 | 7 | 6 |
| 8 | B | 9 | 8 | 7 |
| 9 | F | 10 | 9 | 8 |
| 10 | G | 12 | 10 | 9 |
| 11 | E | 13 | 11 | UNINIT |
| 12 | C | 14 | 12 | 10 |
| 13 | B | 15 | 13 | 11 |
| 14 | F | 16 | 14 | 12 |
| 15 | H | 17 | 15 | 13 |
| 16 | D | 19 | 16 | 14 |
| 17 | E | 20 | 17 | 15 |
| 18 | H | 21 | 18 | UNINIT |
| 19 | F | 22 | 19 | 16 |
| 20 | G | 23 | 20 | 17 |
| 21 | C | 25 | 21 | 18 |
| 22 | D | 26 | 22 | 19 |
| 23 | B | 27 | 23 | 20 |
| 24 | A | 28 | 24 | UNINIT |
| 25 | E | 29 | 25 | 21 |
| 26 | G | 30 | 26 | 22 |
| 27 | H | 32 | 27 | 23 |
| 28 | H | 33 | 28 | 24 |
| 29 | D | 34 | 29 | 25 |
| 30 | C | 35 | 30 | 26 |
| 31 | B | 36 | 31 | UNINIT |
| 32 | A | 37 | 32 | 27 |
| 33 | A | 38 | 33 | 28 |
| 34 | G | 39 | 34 | 29 |
| 35 | H | 40 | 35 | 30 |
| 36 | E | 41 | 36 | 31 |
| 37 | 0 | 42 | 37 | 32 |
| 38 | F | 43 | 38 | 33 |
| 39 | B | 44 | 39 | 34 |
| 40 | F | 45 | 40 | 35 |
| 41 | * | ** | ** | 36 |
| 42 | * | ** | ** | 37 |
| 43 | * | ** | ** | 38 |
| 44 | * | ** | ** | 39 |
| 45 | * | * | ** | 40 |

The Article Identification Array (the second column in Table I) shows the article identification numbers for articles in the order the articles appear on the sorting conveyor 40 (and hence the example, there are eight distinct article identification numbers, represented by the letters A-H. The number A is the smallest number of the eight, the number B the next smallest, etc., with the number H being the largest (i.e., $A<B<C<D<E<F<G<H$). The sorting conveyor 40, which has forty-five loading points, carries a total of forty articles. Of these forty articles, there are five identical articles identified with the number A, five identical articles identified with the number B, etc. In the example, the array shows that these articles are received in an unsorted sequence.

The Conveyor Loading Point Location Array (the third column in Table I) shows those loading point locations where an article is loaded. This array shows that there are articles in locations 1-3, 5-10, 12-17, 19-23, 25-30 and 32-45.

The Sorted Order Array, as a result of the process of loading data, shows the order of the articles as the articles are received from the database 13. In the example, the array contains numbers 1-40 corresponding to the forty articles appearing in the Article Identification Array.

The Conveyor Index Array indicates the location of empty loading points along the length of the conveyor 40. These empty loading points are indicated by the UNINITIALIZED entry in the Conveyor Index Array (abbreviated "UNINIT"). Each number in the array indicates an article in the sequence of articles. When the UNINITIALIZED entries in the Conveyor Index Array are compared to the entries in the Sequence Number column, it can be seen that the 4th, 11th, 18th, 24th, and 31st sorting conveyor loading point addresses are left unloaded or empty. Moreover, with reference to the Article Identification Array, it can be seen that the 4th article on the conveyor 40 is found at loading point address 5, the 10th article on the conveyor 40 is found at loading point address 12, the 16th article on the conveyor 40 is found at loading point address 19, the 21st article on the conveyor 40 is found at loading point address 25, and the 27th article on the conveyor 40 is found at loading point address 32.

The effect of the sorting performed by LoadSort 300 is a manipulation of the information loaded in the Sorted Order Array such that the AIDs of the articles can be read in ascending AID order. As a result of the LoadSort 300 sorting process, each element of the Sorted Order Array (beginning with the first element) contains a number indicating the position of an AID (within the Article Identification Array) such that the sequence of entries in the Sorted Order Array indexes a sequence of ascending AIDs within the Article Identification Array. The sorting technique preferred for this operation is the "quicksort" method, but other sorting techniques, such as a bubble sort or a shell sort, will suffice.

Table II presents the results of Phase I sorting of the information in the Sorted Order Table presented in Table I.

TABLE II

| Sequence Number | Article Identification Array (AID$_i$) | Conveyor Loading Point Array (LP$_j$) | Sorted Order Array | Conveyor Index Array |
|---|---|---|---|---|
| 1 | E | 1 (5) | 3 | 1 |
| 2 | D | 2 (4) | 5 | 2 |
| 3 | A | 3 (1) | 24 | 3 |
| 4 | G | 5 (7) | 32 | UNINIT |
| 5 | A | 6 | 33 | 4 |
| 6 | C | 7 (3) | 8 | 5 |
| 7 | C | 8 | 13 | 6 |
| 8 | B | 9 (2) | 23 | 7 |
| 9 | F | 10 (6) | 31 | 8 |
| 10 | G | 12 | 39 | 9 |
| 11 | E | 13 | 6 | UNINIT |
| 12 | C | 14 | 7 | 10 |
| 13 | B | 15 | 12 | 11 |
| 14 | F | 16 | 21 | 12 |
| 15 | H | 17 (8) | 30 | 13 |
| 16 | D | 19 | 2 | 14 |
| 17 | E | 20 | 16 | 15 |
| 18 | H | 21 | 22 | UNINIT |
| 19 | F | 22 | 29 | 16 |
| 20 | G | 23 | 37 | 17 |
| 21 | C | 25 | 1 | 18 |
| 22 | D | 26 | 11 | 19 |
| 23 | B | 27 | 17 | 20 |
| 24 | A | 28 | 25 | UNINIT |
| 25 | E | 29 | 36 | 21 |
| 26 | G | 30 | 9 | 22 |
| 27 | H | 32 | 14 | 23 |
| 28 | H | 33 | 19 | 24 |
| 29 | D | 34 | 38 | 25 |

TABLE II-continued

| Sequence Number | Article Identification Array (AID$_i$) | Conveyor Loading Point Array (LP$_j$) | Sorted Order Array | Conveyor Index Array |
|---|---|---|---|---|
| 30 | C | 35 | 40 | 26 |
| 31 | B | 36 | 4 | UNINIT |
| 32 | A | 37 | 10 | 27 |
| 33 | A | 38 | 20 | 28 |
| 34 | G | 39 | 26 | 29 |
| 35 | H | 40 | 34 | 30 |
| 36 | E | 41 | 15 | 31 |
| 37 | D | 42 | 18 | 32 |
| 38 | F | 43 | 27 | 33 |
| 39 | B | 44 | 28 | 34 |
| 40 | F | 45 | 35 | 35 |
| 41 | * | * | ** | 36 |
| 42 | * | ** | ** | 37 |
| 43 | * | ** | ** | 38 |
| 44 | * | ** | ** | 39 |
| 45 | * | ** | ** | 40 |

The sequence of entries in the Sorted Order Array of Table II identify a sequence of entries in the Article Identification Array which contain article identification numbers in an ascending order. Articles with identical identification numbers are ordered according to lowest position on the sorting conveyor 40. For example, since A is the smallest article identification number and the first A on the sorting conveyor 40 is third in the sequence of AIDs (i.e., it is located in the third element of the Article Identification Array), the first element of the Sorted Order Array contains a "3." The next A is fifth in the sequence of AIDs, so the next element in the Sorted Order Array is "5." This indexing applies to each of the five As. Since B is the next smallest article identification number (larger than A) and the first B on the sorting conveyor 40 is eighth in the sequence of AIDs, the sixth element of the Sorted Order Array (there having been five As preceding the first B) contains an "8." The second B on the sorting conveyor 40 is designated in the next element of the Sorted Order Array as "13," it being thirteenth in the sequence of AIDs, and so on. The numbering applies in this way throughout the balance of the article identification numbers. The result of the sorting is what appears in the Sorted Order Array column of Table II.

As a result of the Phase I sorting process, each article loaded on the sorting conveyor 40 (as indicated by an entry in the Article Identification Array) is identified in terms of its loading point address on the sorting conveyor 40 (as indicated by a corresponding entry in the Conveyor Loading Point Array). Also, Phase I sorting results in a Sorted Order Array which indexes the Article Identification and Conveyor Loading Point Arrays according to an ascending sequence of article identification numbers.

With Phase I sorting completed, the NOTDONE flag is cleared. As a result of clearing the NOTDONE flag, the LoadSort process 300 will receive from the FinalLists process 400 (discussed below) a series of requests for information. When LoadSort 300 receives the first request after Phase I sorting is complete (i.e., the first request after the NOTDONE flag is cleared), LoadSort 300 sends to the FinalLists process 400 the number of articles for sorting (i.e., ARTCOUNT). Responsive to receipt of subsequent requests from FinalLists 400, LoadSort 300 sends Conveyor Loading Point Array information in sorted order using the Sorted Order Array for indexing.

Phase II Sorting

FinalLists—The FinalLists process 400 accomplishes Phase II sorting of the information representing articles loaded on the sorting conveyor 40. In so doing, FinalLists 400 creates a work list of articles to be unloaded by each drop station taking part in the sorting of articles. These work lists are created from the information requested of the LoadSort process 300 which has been passed to FinalLists 400 as discussed above. The requests to LoadSort 300 are triggered by the clearing of the NOTDONE flag. FinalLists 400 determines how many requests to make from the ARTCOUNT value received from LoadSort 300.

The Phase II sorting performed by FinalLists 400 works to reduce the number of sorting conveyor revolutions needed to drop-off all articles at designated conveyor drop stations. It does this within certain criteria for a given sorting job.

One criterion which is always taken into account by FinalLists 400 is that a set of articles with identical article identification numbers shall be unloaded at a single drop-off station only. That is, such identical articles shall not be unloaded at two or more stations. Of course, there may be several of such sets of identical articles loaded on the sorting conveyor 40 for any given sort. This criterion requires only that a given set be dropped at one drop station, not that all such sets must be dropped at one station or that two or more sets cannot be dropped at a single drop station.

A second criterion, which is optional for a given sort, is to drop off articles at a given drop station or stations based in part on a subset of the AID information such articles may have in common. So, for example, if AID information on articles is representative of, among other things, the delivery route used to deliver sorted articles, a constraint can be placed on Phase II sorting to require all articles with a given common delivery route to be dropped at a single drop station or set of drop stations. FinalLists 400 receives optional sorting criteria as input information from workstation 12, via interface processor 11, entered by the system user. FinalLists 400 uses this sorting criteria in creating the work lists of articles to be sorted at the drop stations.

Prior to creating a work list of articles for each drop station, FinalLists 400 determines the total number of revolutions of the sorting conveyor 40 it would take to sort all articles on the sorting conveyor 40 if only a single drop station was available for sorting. This number is the basis for determining how many revolutions of the sorting conveyor 40 need to be assigned to the individual drop stations available for sorting such that all articles will be sorted. In order to determine the number of revolutions, FinalLists 400 scans the information it has received from LoadSort 300 (as discussed above, this information comprises sorting conveyor loading point addresses in the sorted order where articles are loaded). FinalLists 400 counts the number of times a loading point address is smaller than the address preceding it in the Phase I sorted order sequence of loading point addresses.

With reference to the example provided in Table II, this decrease in address value occurs eight times. For example, considering the loading point address values for the articles having the article identification number A in the sorted order, these five articles have the following loading point addresses: 3, 6, 28, 37, 38. Consecutive addresses in this sequence are always increasing: 6>3, 28>6, 37>28, and 38>37. The very next article in the sorted order is one with an article identification number B. Its address is 9. Going from 38 to 9 is a decrease in loading point addresses of the sorted order sequence. Thus, the sequence of addresses in the sorted order proceed as follows: 3, 6, 28, 37, 38, 9, . . . . This decrease, from 38 to 9, counts as one revolution since to unload an article at loading point 9 after unloading an article at loading point 38, the conveyor 40 must be moved past its first or initial loading point on the way to loading point 9. Following the balance of the sorted order of loading point addresses, there are seven additional decreases in loading point addresses. The numbers in parentheses in the Conveyor Loading Point Array column of Table II denote the beginning of each revolution of the sorting conveyor 40.

Once the number of revolutions of the sorting conveyor 40 has been determined, these can then be divided among the drop stations available for the sort. Assuming that there is no constraint on the sort, other to make certain that identical articles are not sorted at more than one drop station, these revolutions are divided as evenly as possible. For example, given the sort presented in Table II, and assuming there are three drop stations available, two of the drop stations would be assigned three revolutions while the third would be assigned two.

To assign revolutions, a work list or Drop Station Array is built for each working drop station. The entries in the array comprise an AID and its corresponding loading point address for articles in the sorted order. The entries for the first Drop Station Array begin with the AID and loading point address of the article which is first in the sorted order. The entries proceed according to sorted order until the number of revolutions allocated for the drop station, indicated by the number of decreases in the sequence of loading point addresses, is satisfied. When including data for an article would increment the revolution count beyond that allocated for a drop station, the data should not be included in the Drop Station Array in question, but should be included in the Array for the next available drop station.

Table III presents the Drop Station Arrays for a three drop station sort using the data from Table II.

TABLE III

| Drop Station 1 | Drop Station 2 | Drop Station 3 |
|---|---|---|
| A   3 (1) | D   2 (4) | G   5 (7) |
| A   6 | D   19 | G   12 |
| A   28 | D   26 | G   23 |
| A   37 | D   34 | G   30 |
| A   38 | D   42 | G   39 |
| B   9 (2) | E   1 (5) | H   17 (8) |
| B   15 | E   13 | H   21 |
| B   27 | E   20 | H   32 |
| B   36 | E   29 | H   33 |
| B   44 | E   41 | H   40 |
| C   7 (3) | F   10 (6) | |
| C   8 | F   16 | |
| C   14 | F   22 | |
| C   25 | F   43 | |
| C   35 | F   45 | |

Thus the first and second drop stations are responsible for three revolutions, while the third drop station is responsible for two, as indicated by the numbers in parentheses. These numbers in parentheses correspond to those in Table II.

Once the number of revolutions have been divided among the drop stations, there remains an optimization step for each Drop Station Array which takes advantage of the identity of articles on the sorting conveyor 40. The aim of this optimization step is to reduce, if possible, the number of revolutions the sorting conveyor 40 need make to unload all articles at the drop stations. FinalLists 400 performs this optimization by rotating entries in the Drop Station Arrays to take advantage of the circumstance where the last article in a given revolution has a loading point address which is less than one or more loading point addresses of a group of identical articles in the next revolution, the group of identical articles immediately contiguous with the last article of the given revolution.

For example, in Drop Station Array 1 presented in Table III, the last loading point address in the first revolution of the sorting conveyor 40 is 38. In the group of identical articles in the second revolution immediately contiguous with the last article of the first revolution (i.e., those articles identified with AID B), one of the group has a loading point address greater than 38. This article—B at loading point 44—can be rotated in the table to a position immediately after article A at address 38. This is possible because all articles identified with the same article identification number are equivalent. The object of the rotation is to extend a prior revolution as long as possible consistent with the sorted order received from LoadSort 300. A similar rotation can be made with the last two F articles in Drop Station Array 2 since their loading point addresses are greater than the last address in the preceding revolution. The rotation can also be performed on the last H article in Drop Station Array 3.

In addition to the rotation of entries in the Drop Station Arrays, FinalLists 400 counts the number of revolutions at each drop station as a result of entry rotation. The counting of entries could be done as described above (i.e., counting revolutions for dividing among the individual working drop stations), but it is preferred that it be done in a different manner.

For each drop station, it is preferred that FinalLists 400 count revolutions relative to the drop station's distance, in loading point count, from the station where articles are loaded on the sorting conveyor 40 for sorting. That is, for each drop station 70, a revolution begins when the first loading point of the sorting conveyor 40, $LP_1$, passes the loading station of the sorting conveyor 40. In other words, the revolution count for each drop station 70 must be incremented each time the loading point with an address equal to the distance (in loading point count) between the drop station and the loading station passes the drop station 70. The reason for this is that in order to begin to load articles for sorting after a previous article sort has been completed, the sorting conveyor 40 must be positioned such that $LP_1$ is at the loading station. If $LP_1$ has passed the loading station, the sorting conveyor 40 must complete an additional revolution before it can receive additional articles for sorting.

Assuming that Drop Station 1 is thirty-five loading point addresses from the loading station, Drop Station 2 is twenty-five loading point addresses from the loading station, and Drop Station 3 is fifteen loading point addresses from the loading station, the result of the rotations and preferred revolution counting is presented in Table IV below.

TABLE IV

| Drop Station 1 | Drop Station 2 | Drop Station 3 |
|---|---|---|
| A  3 (1) | D  2 (4) | G  5 (7) |
| A  6 | D 19 | G 12 |
| A 28 | D 26 (5) | G 23 (8) |
| A 37 (2) | D 34 | G 30 |
| A 38 | D 42 | G 39 |
| B 44 | E  1 | H 40 |
| B  9 | E 13 | H 17 (9) |
| B 15 | E 20 | H 21 |
| B 27 | E 29 (6) | H 32 |
| B 36 (3) | E 41 | H 33 |
| C  7 | F 43 | |
| C  8 | F 45 | |
| C 14 | F 10 | |
| C 25 | F 16 | |
| C 35 | F 22 | |

As a result of the above described rotations, the number of articles unloaded during some revolutions has changed. In this example the number of revolutions required to unload all articles has decreased from 3 to 2.77 (the highest numbered address required to be unloaded after the second revolution is 35, rather than 45; 35/45=0.77). For larger sorts, reductions of one or more revolutions are possible.

As a result of reductions in revolutions, it may be that certain drop stations need perform fewer revolutions than others. Generally, an imbalance in the number of revolutions performed by the drop stations is undesirable since a sort is not complete until the last working drop station has completed its work list of articles to be unloaded. To take advantage of reductions in revolutions required by a drop station, FinalLists 400 repeats the above described revolution distribution process to distribute revolutions differently than previously done.

FinalLists 400 attempts to reduce, if possible, the number of 15 revolutions at the drop station having the largest revolution count of all drop stations participating in a given sort. To do this, FinalLists 400 will first attempt to allocate extra revolutions to the Drop Station Array or Arrays which saved the most as a result of the rotation of articles. FinalLists 400 will do this several times with different allocations of revolutions in an attempt to determine the allocation of revolutions which allows for saving the greatest number of revolutions. FinalLists 400 will stop its search either (1) when the result of a revolution distribution and rotation process is a set of Drop Station Arrays where the minimum and maximum revolution counts for such arrays differ by no more than one revolution or (2) an arbitrary limit is reached in the number of times FinalLists 400 reallocates revolutions, e.g., 5. In the case of the arbitrary limit, FinalLists 400 chooses the best solution found to tha time.

Because rotating entries in the Drop Station Arrays and counting revolutions after each rotation must be done for each drop station participating in the sorting process, it may be desireable to provide other processors, in addition to control processor 10, to perform the computations necessary for each individual drop station. Such multiple processors would serve to speed up the entry rotation and revolution counting tasks, especially for sorts involving a large number of articles and drop stations.

The above example of Phase II sorting assumed that there was no constraint on the sort other than to make certain that identical articles are not sorted at more than on drop station. However, as discussed above, it may be important to unload all articles with a certain characteristic in common at a particular drop station or stations. Article characteristics are indicated as fields within an article identification, AID. For example, it may be that it is desirable to unload articles at drop stations not merely in ascending AID order, but also according to delivery route. If so, a system user would provide this sorting criterion (or constraint) to FinalLists 400 by entering information at workstation 12 indicating route-based sorting. Such information includes the type of sort (e.g., route-based) and the identity of drop stations to be used in the allocation (e.g., the drop station or stations to be used for each route). For the above example, assuming all articles having AIDs of A, B, C, and D are delivered along a given delivery route, all articles having AIDs E and F are delivered along a second delivery route, and all articles having AIDs G and H are delivered along a third delivery route, the initial assignment of revolutions for a route-based sort with one drop station per route would be as presented in Table V.

TABLE V

| Drop Station 1 | Drop Station 2 | Drop Station 3 |
|---|---|---|
| A  3 (1) | E  1 (5) | G  5 (7) |
| A  6 | E 13 | G 12 |
| A 28 | E 20 | G 23 |
| A 37 | E 29 | G 30 |
| A 38 | E 41 | G 39 |
| B  9 (2) | F 10 (6) | H 17 (8) |
| B 15 | F 16 | H 21 |
| B 27 | F 22 | H 32 |
| B 36 | F 43 | H 33 |
| B 44 | F 45 | H 40 |
| C  7 (3) | | |
| C  8 | | |
| C 14 | | |
| C 25 | | |
| C 35 | | |
| D  2 (4) | | |
| D 19 | | |
| D 26 | | |
| D 34 | | |
| D 42 | | |

From this point on, FinalLists 400 performs the rotation on the Drop Station Arrays and the counting of revolutions as described above. The only difference is that in this situation, reallocation of sorting conveyor revolutions is limited by the constraint on the sort. In this example, no reallocation is possible since to do so would violate the constraint that articles with common delivery routes be grouped together at drop stations. However, if more than one drop station were specified per route, such reallocation may occur.

As discussed above, Phase II sorting of database 13 information is accompanied by the operation of the Conveyor process which controls the motor system of the sorting conveyor 40. The Conveyor process comprises three sub-processes discussed below.

(1) MainConveyor—The MainConveyor process 200 is responsible for the high level control of the sorting conveyor motor unit 60 and thus the positioning of the sorting conveyor 40.

(2) Positioner—The Positioner process 201 is responsible for positioning the sorting conveyor 40 according to the commands of the MainConveyor process 200. The Positioner 201 breaks down commands from MainConveyor 200 to the required combination of elemental positioning commands understood by the sorting conveyor motor unit 60 (see above).

(3) Motor—The Motor process 202 is responsible for receiving i0 commands from the Positioner process 201 and translating the those commands into strings of bits for communication to the sorting conveyor motor unit 60. See the section cn the sorting conveyor motor unit 60 above for a discussion of the command set of the sorting conveyor motor unit 60.

When MainConveyor 200 determines that the mode of the system has transitioned from a non-SORT mode to the SORT mode, it directs the Positioner 201 to command the sorting conveyor motor unit to move the conveyor at its fast speed. The Positioner 21 does this by issuing a CONVEYOR FAST command to the sorting conveyor motor unit 60 via the Motor process 202 (discussed above).

Physical Sorting of Articles

Once the work lists for the individual drop stations 70 have been created and optimized by FinalLists 400, the physical sorting of articles can occur. This physical sorting is accomplished by the DropStation process 500 of the control processor 10 which receives from the FinalLists process 400 a work list or Drop Station Array for each drop station in use and uses each work list as the basis for control of the physical sort at each drop station 70.

Dropstation—The DropStation process 500 is comprised of one or more constituent processes referred to as the DropMain processes. Each DropMain process is responsible for controlling a group of up to eight drop stations 70.

DropMain monitors the loading points of the sorting conveyor 40 as they pass by each of its associated drop stations 70, thus keeping track of the position of the conveyor relative to each such drop station 70. It does this by keeping track of events reported to it by each associated drop station 70. Each drop station 70 of a DropMain group is equipped with sensors to detect and report certain events which occur by virtue of the movement of the sorting conveyor 40 past the drop station 70. One of these events occurs when the conveyor's 40 reference point 46 passes a drop station 70. Another occurs when any loading point passes a drop station 70. DropMain uses information about the conveyor reference point 46 passing one of its drop stations 70 to clear a loading point counter associated with that drop station. It uses information concerning a loading point passing a drop station 70 to increment the loading point counter. There are separate loading point counters for each drop station 70 in a DropMain group. In this way, each such counter can be initialized and updated when appropriate.

In addition to monitoring events reported by each drop station 70, DropMain also commands each drop station 70 to unload articles from the sorting conveyor 40 at the appropriate time. It does this by comparing the current loading point counter value (a loading point address) for a given drop station with the first (or next) loading point address entry in the drop station's work list. If the two are equal, DropMain sends an UNLOAD command to the drop station in question to unload an article from the sorting conveyor. After a delay allowing a mechanical unloading mechanism to move to the position where it unloads an article, DropMain sends a READY FOR UNLOADING command to place the mechanical unloading mechanism of the drop station in condition to respond to the next UNLOAD command from DropMain. In the case of the exemplary drop station discussed in co-pending U.S. Application Ser. No. 07/643,435,entitled "Apparatus for Unloading Articles," referenced above, the UNLOAD command concerns firing a solenoid which triggers the unloading of an article from the sorting conveyor 40.

We claim:

1. A system for sorting articles comprising:
   a conveyor for transporting one or more articles thereon;
   a database for storing identification information for each article on the conveyor and address information specifying the location of each article on the conveyor.
   a plurality of drop stations adjacent to the conveyor for unloading articles;
   a processor, coupled to the conveyor , the drop stations, and the database, for accessing article information from the database, allocating to each of the drop stations a respective list of articles sorted according to one or more sorting criteria, rearranging each allocated list of articles to increase the number of articles which can be unloaded at the respective drop station per revolution of the conveyor, and for controlling each drop station to unload articles from the conveyor which are contained in the respective list.

2. The system of claim 1 wherein the articles comprise garments hung on hangers.

3. The system of claim 1 wherein article information accessed from the database comprises identification information for each article on the conveyor and address information specifying the location of each article on the conveyor.

4. The system of claim 1 wherein the conveyor comprises a motor unit which receives commands from the processor.

5. The system of claim 4 wherein the motor unit comprises a motor and a clutch drive.

6. The system of claim i wherein a drop station reports to the processor the event of a reference point of the conveyor arriving at the drop station.

7. The system of claim 1 wherein a drop station reports to the processor the event of a loading point of the conveyor arriving at the drop station.

8. The system of claim 7 wherein the processor keeps track of the conveyor loading point address at a drop station by counting reported events of a loading point arriving at the drop station.

9. The system of claim 8 wherein the processor sends a command to a drop station to unload an article when the conveyor loading point address at the drop station is equal to the address of the next article to be unloaded as indicated by the respective list of articles to be unloaded at the drop station.

10. The system of claim 1 wherein the processor controls a drop station by sending a command to the drop station to unload an article from a loading point.

11. The system of claim 1 wherein the allocation of articles comprises ordering the articles in ascending article identification order.

12. The system of claim wherein the one or more sorting criteria comprise a characteristic common to a plurality of articles on the conveyor.

13. The system of claim 12 wherein a characteristic common to a plurality of articles comprises a delivery route.

14. The system of claim 12 wherein a characteristic common to a plurality of articles comprises a customer account.

15. The system of claim 12 wherein a characteristic common to a plurality of articles comprises an article user.

16. The system of claim 15 wherein the article user common characteristic comprises a garment wearer.

17. The system of claim 12 wherein a characteristic common to a plurality of articles comprises an article type.

18. The system of claim 17 wherein the article type common characteristic comprises a garment type.

19. The system of claim 12 wherein a characteristic common to a plurality of articles comprises an article identification.

20. The system of claim 19 wherein rearranging each list of articles includes rotating at least one of the lists of articles.

21. A method for physically unloading articles on a conveyor at a plurality of drop stations comprising the steps of:
sorting a list of articles to be physically unloaded by the drop stations according to one or more sorting criteria;
allocating each of the drop stations a portion of the list of articles to be physically unloaded by the drop station;
rearranging each allocated portion of the list of articles to optimize the unloading of the articles by the drop stations; and
controlling the operation of each of the drop stations to physically unload articles corresponding to the allocated portions of the list.

22. A method according to claim 21 wherein the step of sorting includes the step of positioning articles in ascending article identification order.

23. A method according to claim 21 wherein the sorting criteria comprise a characteristic common to articles on the conveyor.

24. A method according to claim 23 wherein a characteristic common to articles on the conveyor comprises an article identification.

25. A method according to claim 24 wherein the step of rearranging includes the step of rotating at least one of the portions of the list of articles.

26. A method according to claim 23 wherein a characteristic common to a plurality of articles comprises a delivery route.

27. A method according to claim 23 wherein a characteristic common to a plurality of articles comprises a customer account.

28. A method according to claim 23 wherein a characteristic common to a plurality of articles comprises an article user.

29. A method according to claim 28 wherein the article user common characteristic comprises a garment wearer.

30. A method according to claim 23 wherein a characteristic common to a plurality of articles comprises an article type.

31. A method according to claim 30 wherein the article type common characteristic comprises a garment type.

32. A method according to claim 21 wherein the step of controlling the operation of each drop station comprises sending a command to the drop station to unload an article from a loading point.

33. A method according to claim 21 further comprising the step of keeping track of loading point addresses of the conveyor at each drop station.

34. A method according to claim 33 wherein the step of keeping track of loading point addresses at each drop station comprises the step of counting each time a loading point arrives at the drop station.

35. A method according to claim 33 wherein the step of controlling the operation of each drop station comprises the step of commanding a drop station to unload an article when the conveyor loading point address at the drop station is equal to the address of the next article to be unloaded as indicated by the corresponding portion of the list of articles to be unloaded by the drop station.

36. A method according to claim 21 wherein the step of allocating to each of the drop stations a portion of the list of articles comprises allocating a set of articles with identical article identification numbers to a single drop station.

37. A method for physically unloading articles on a conveyor at one or more available drop stations comprising the steps of:
(a) ordering a list of articles in ascending article identification order;
(b) determining the number of revolutions of the conveyor needed to physically sort all articles in ascending order at a single drop station;
(c) allocating the number of revolutions determined in step (b) among the one or more available drop stations to create a list of articles to be physically sorted by each drop station;
(d) rotating entries in a group of identical articles in a list of articles allocated to a drop station when doing so would increase the number of articles which can be physically sorted by the drop station in a revolution of the conveyor;
(e) determining the number of revolutions of the conveyor needed to physically sort articles in each list of articles allocated to each drop station and comparing the number of revolutions to determine whether the minimum and maximum number of revolutions required by the drop stations differ by more than one revolution;
(f) if the minimum and maximum number of revolutions required by the drop stations differ by more than one revolution, repeat steps (c), (d), and (e) until either
(1) the minimum and maximum number of revolutions required by the drop stations differ by one revolution or less, or
(2) the number of repetitions of steps (c), (d), and (e) equals a predetermined number; and
(g) controlling the operation of each of the one or more drop stations to physically unload articles according to an allocated list of articles.

38. A method according to claim 37 further comprising the step of sorting each list of articles allocated to a drop station according to one or more sorting criteria.

39. A method according to claim 38 wherein the sorting criteria comprise a characteristic common to articles on the conveyor.

40. A method according to claim 39 wherein a characteristic common to a plurality of articles comprises a delivery route.

41. A method according to claim 39 wherein a characteristic common to a plurality of articles comprises a customer account.

42. A method according to claim 39 wherein a characteristic common to a plurality of articles comprises an article user.

43. A method according to claim 42 wherein the article user common characteristic comprises a garment wearer.

44. A method according to claim 39 wherein a characteristic common to a plurality of articles comprises an article type.

45. A method according to claim 44 wherein the article type common characteristic comprises a garment type.

46. A method according to claim 37 wherein the step of controlling the operation of each drop station comprises sending a command to the drop station to unload an article from a loading point.

47. A method according to claim 37 further comprising the step of keeping track of loading point addresses of the conveyor at each drop station.

48. A method according to claim 47 wherein the step of keeping track of loading point addresses at each drop station comprises the step of counting each time a loading point arrives at the drop station.

49. A method according to claim 47 wherein the step of controlling the operation of each drop station comprises the step of commanding a drop station to unload an article when the conveyor loading point address at the drop station is equal to the address of the next article to be unloaded as indicated by the list of articles to be sorted for the drop station.

50. A method according to claim 37 wherein steps (d) and (e) are performed by a plurality of processors, each such processor performing steps (d) and (e) for a group of one or more drop stations.

51. A method for loading and unloading articles on a conveyor at a plurality of drop stations comprising the steps of:
transporting a sequence of one or more articles to be sorted;
scanning an article in the sequence with a scanner to determine the identification of the article;
communicating the identification of the scanned article from the scanner to a processor;
communicating commands from the processor to a loading device to effect the loading of the article onto a conveyor, the article being loaded at a conveyor location;
communicating conveyor position information from the loading device to the processor;
sorting a list of articles to be unloaded by the drop stations according to one or more sorting criteria;
allocating to each of the drop stations a respective sublist of the list of articles to be unloaded by the drop station;
rearranging each allocated sublist of articles to increase the number of articles which can be unloaded by the respective drop station in a revolution of the conveyor; and
controlling the operation of each of the drop stations to unload articles contained in the respective sublist.

* * * * *

UNITED STATES PATENT AND TRADEMARK OFFICE
CERTIFICATE OF CORRECTION

PATENT NO.    : 5,220,511
DATED         : June 15, 1993
INVENTOR(S)   : Speckhart et al.

It is certified that error appears in the above-indentified patent and that said Letters Patent is hereby corrected as shown below:

Column 2, line 55, change "100" to --10--;

Column 6, line 32, change "processor" to --processor 10--;

Column 7, line 2, change "cess 40" to --cess 400--;

Column 9, line 43, change "*" to --**--;

Column 9, line 48, change "...hence the..." to --hence the
              order the numbers were received from
              the database 13).  In the...--

Column 11, line 16, change "*" to --**--;

Column 15, line 53, change "tha" to --that--;

Column 17, line 2, delete i0;

Column 17, line 5, change "cn" to --on--;

UNITED STATES PATENT AND TRADEMARK OFFICE
CERTIFICATE OF CORRECTION

PATENT NO. : 5,220,511
DATED : June 15, 1993
INVENTOR(S) : Speckhart et al.

It is certified that error appears in the above-indentified patent and that said Letters Patent is hereby corrected as shown below:

Column 18, line 40, change "i" to --1--;

Column 18, line 63, change "claim" to --claim 1--;

Signed and Sealed this

Fifth Day of December, 1995

BRUCE LEHMAN

Attest:

Attesting Officer

Commissioner of Patents and Trademarks